Figure 3:
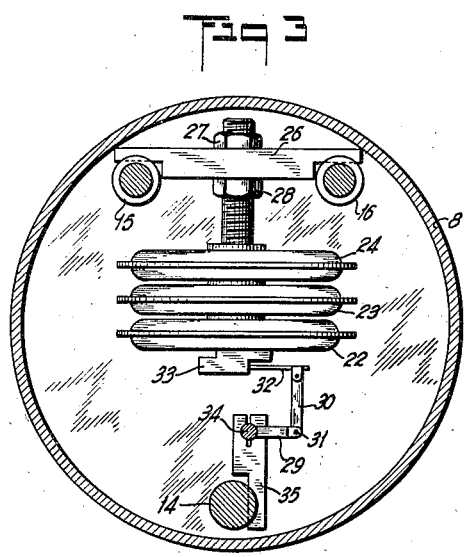

Nov. 16, 1937.   V. E. CARBONARA   2,099,466
ALTIMETER
Filed June 9, 1932   3 Sheets-Sheet 1
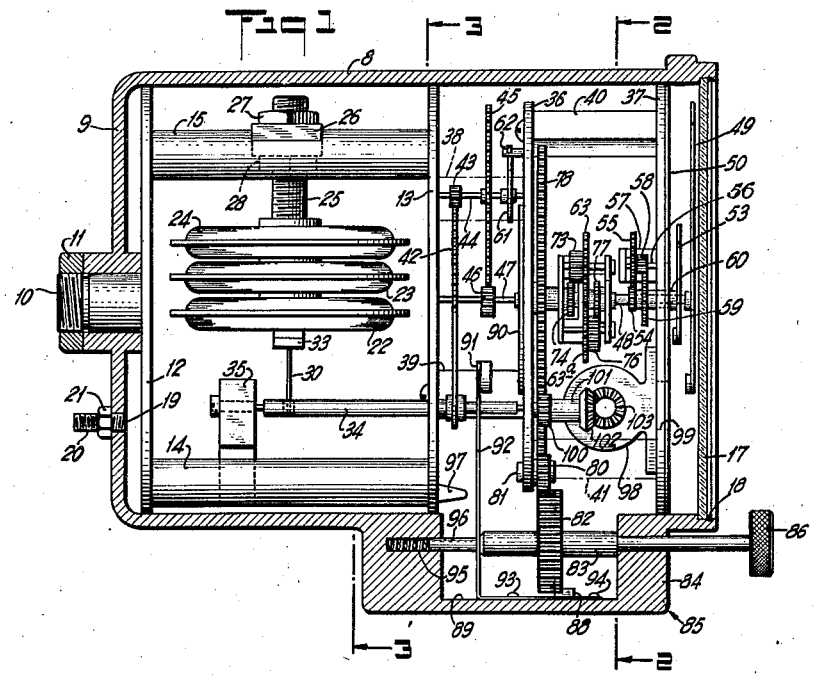
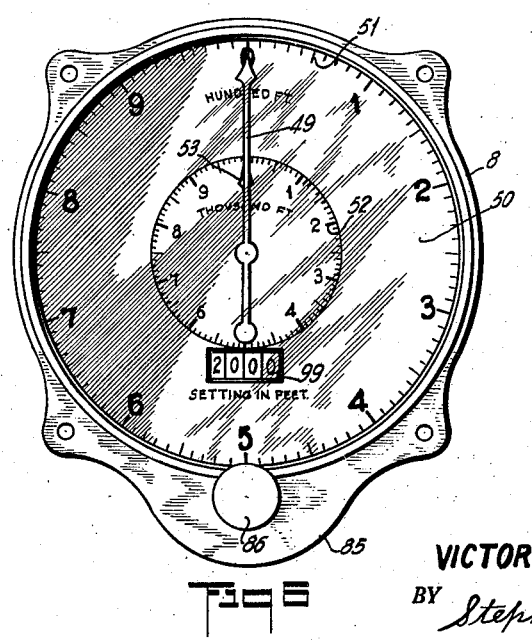
INVENTOR.
VICTOR E. CARBONARA
BY Stephen Cerstvik.
ATTORNEY.

Nov. 16, 1937.  V. E. CARBONARA  2,099,466
ALTIMETER
Filed June 9, 1932  3 Sheets-Sheet 2

INVENTOR.
VICTOR E. CARBONARA
BY Stephen Cerstvik.
ATTORNEY

Nov. 16, 1937.     V. E. CARBONARA     2,099,466
ALTIMETER
Filed June 9, 1932          3 Sheets—Sheet 3
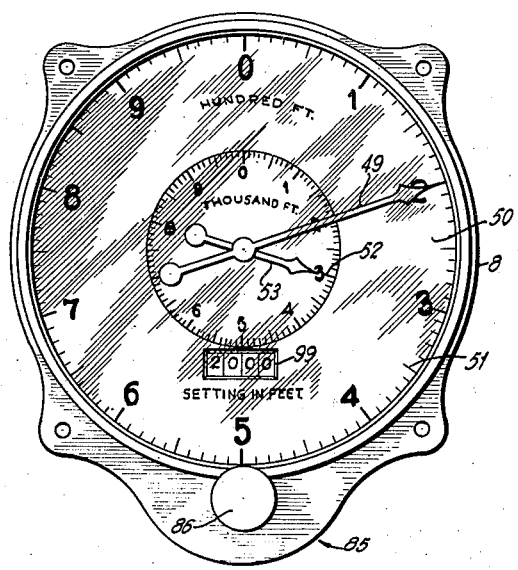
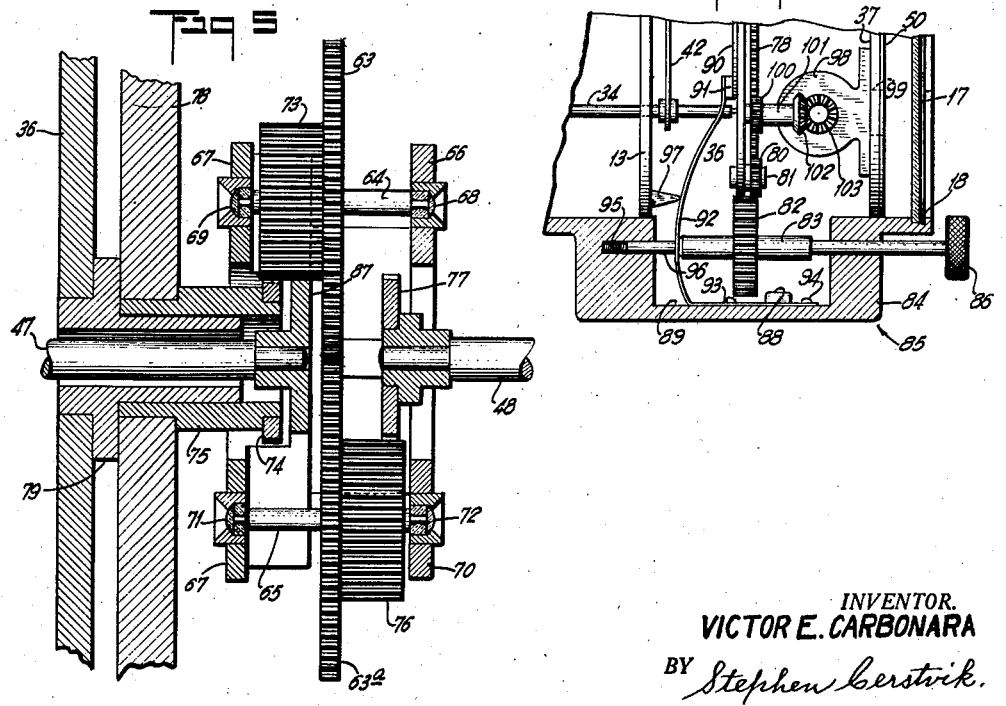
INVENTOR.
VICTOR E. CARBONARA
BY Stephen Gerstvik.
ATTORNEY.

Patented Nov. 16, 1937

2,099,466

UNITED STATES PATENT OFFICE 2,099,466

ALTIMETER

Victor E. Carbonara, Rockville Centre, N. Y., assignor to Bendix Aviation Corporation, South Bend, Ind., a corporation of Delaware Application June 9, 1932, Serial No. 616,322

60 Claims. (Cl. 73—4)

The present invention relates to indicating instruments such, for example, as sensitive altimeters and constitutes a modification of the invention disclosed in my copending application Serial No. 606,504 filed April 20, 1932.

As pointed out in the above-mentioned copending application, in indicating instruments of certain types, such as altimeters, it is desirable that they be capable of adjustment under one condition for a second and predetermined condition and that they may indicate when said predetermined condition occurs or is reached.

In altimeters, for example, and particularly in sensitive altimeters embodying a plurality of scales and cooperating pointers for indicating altitude in hundreds and thousands of feet, this adjusting feature may be embodied therein in such a manner that the altimeter may be pre-set at one airport having one pressure-level altitude with respect to sea-level for a pressure-level altitude of another airport to and at which it is desired to fly and land so that when the aircraft on which the altimeter is carried lands at the second airport the altimeter will indicate zero altitude, thereby providing the pilot with correct indications of the altitude of his craft with respect to the ground at the airport at which he is going to land.

Although, as indicated above, the invention finds its maximum utility when applied to altimeters, and more particularly to sensitive altimeters having a plurality of pointers and scales, it is to be expressly understood that it may be readily and advantageously embodied in other types of instruments, such, for example, as aneroid thermometers, barometers, pressure gauges, flow meters, stress indicators, hygrostats, barographs, and the like.

One of the objects of the invention is to provide a novel indicating instrument which is so constructed and arranged as to enable one to pre-set the instrument for a predetermined condition in order that a desired result may be obtained or a selected objective reached, the instrument also being adapted to indicate the various conditions which are taking place during the time that the predetermined condition is occurring or is being reached.

Another object is to provide a novel indicating instrument embodying a construction whereby the user is enabled to pre-set the instrument for a particular condition without thereafter rendering the instrument ineffective to clearly indicate conditions other than the pre-set condition.

Another object of the invention is to provide, in an indicating instrument embodying an actuating unit responsive to certain conditions and/or changes in conditions, substances or operations, a plurality of pointers, transmission means for operating said pointers upon operation of said actuating unit for indicating action, novel means included in said transmission means whereby relative movement between the dials and pointers may be obtained simultaneously during indicating action and during setting of the instrument for a predetermined condition so that the pointers will give a desired indication when said condition occurs or is reached.

Another object is to provide in an indicating instrument having pointer and scale means and an actuating device responsive to changes in conditions for operating said pointer means to indicate such changes, novel means for setting the instrument for a predetermined condition so that said pointer means will give a desired indication when said condition occurs or is reached, said setting means including means drivably connecting said actuating device and pointer means whereby the latter may be operated simultaneously by said setting means and said actuating device.

Another object is to provide, in an indicating instrument embodying an actuating unit responsive to certain conditions and/or changes in conditions, substances or operations, novel means whereby the actuating unit is adapted to be rendered ineffective during the setting of the instrument for a predetermined condition without disturbing the relation existing between the actuating unit and the indicating element or elements.

A further object of the invention is to provide, in a sensitive altimeter embodying a plurality of scales and pointers, a pressure-sensitive element and motion amplifying means between the pointers and the pressure-sensitive element, novel means whereby relative movement is produced between the scales and the pointers for setting the altimeter and whereby the pressure-sensitive element is adapted to be rendered inoperative during the setting action so that the altimeter will produce a desired indication when a predetermined altitude is reached and also whereby the predetermined altitude is indicated as a positive quantity when the setting is made, the latter indication remaining unaffected by the indicating action of the instrument and being independent of the scales with which the pointer or pointers cooperate.

A still further object is to provide a novel sensitive altimeter which is so constructed and arranged that the operative connections between the pressure-sensitive means and the indicating means are not broken during setting action of the instrument for a predetermined altitude, but the pressure-sensitive means are adapted to be rendered ineffective to actuate the indicating means during said setting operation.

Still another object is to provide, in an indicating instrument embodying an actuating unit responsive to certain conditions and/or changes in conditions, substances or operations, scale means and pointer means for indicating such conditions and/or changes in conditions and transmission means interconnecting the actuating element and the pointer means, novel single means included in said transmission means, through which the pointer means may be actuated during the indicating action of the instrument and also through which relative movement may be produced between the scale means and the pointer means for setting the instrument, and so constructed and arranged that the operative connections between the actuating unit and the pointer means are not broken during setting of the instrument for a predetermined condition, but the actuating unit is adapted to be rendered ineffective to operate the pointer means during said setting operation.

The above and other objects and advantages of the invention will appear more fully hereinafter from a consideration of the detailed description which follows, taken together with the accompanying drawings wherein one embodiment of the invention is illustrated. It is to be expressly understood however that the drawings are only for the purpose of illustration and description, and are not designed as a definition of the limits of the invention, reference being had for this purpose to the appended claims.

Figure 2:
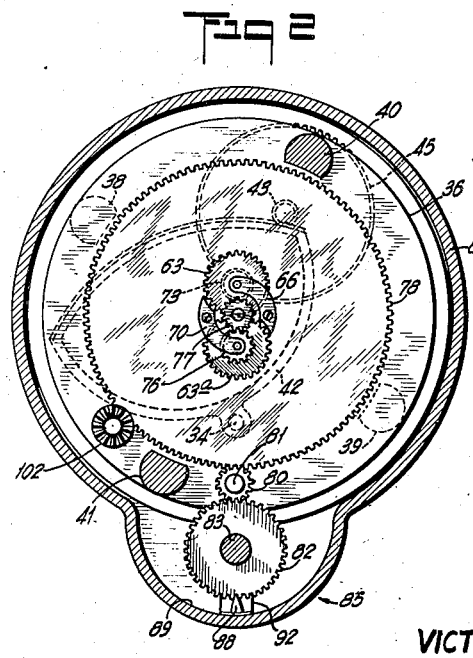

In the drawings wherein like reference characters refer to like parts throughout the several views, Fig. 1 is a longitudinal section through the casing of one form of indicating instrument embodying the present invention, Fig. 2 is a cross sectional view taken on line 2—2 of Fig. 1, Fig. 3 is another cross sectional view taken on line 3—3 of Fig. 1, Fig. 4 is an enlarged partial view of a portion of the manual setting mechanism in position to be operated, Fig. 5 is an enlarged detail view, partly in section, of the novel means through which the setting action and indicating action are effected independently of each other, Fig. 6 is a front elevational view of the instrument shown in Fig. 1 giving a desired indication (zero altitude) for the predetermined condition (2,000 ft. above sea-level) for which the instrument has been set, and Fig. 7 is another front elevation of the instrument indicating conditions which are taking place during the time that the predetermined condition is occurring.

Referring to the drawings and more particularly to Figs. 1, 2, 3 and 4, an instrument embodying the invention is shown in the form of an altimeter having an evacuated pressure-sensitive device adapted to expand and contract upon variations of pressure due to changes in altitude, and an amplification mechanism for amplifying the relatively small movements of the pressure-sensitive device into readily discernible movements of a plurality of pointers over cooperating scales to indicate the altitude in feet or meters or in terms of barometric pressure if desired, the pointers being geared together in such a manner that one moves only a fraction of a revolution for one complete revolution of the other, the latter indicating the altitude in hundreds of feet and the former in thousands of feet or in other units having the same or different ratios.

As illustrated, the altimeter includes a casing or housing 8 which is preferably formed of suitable light weight material such as aluminum or a phenol-condensation product, and which in general outline is cup-shaped having a closed end 9, to the inner surface of which is attached, as by means of a screw 10 and a nut 11, a frame for supporting certain elements of the instrument and for maintaining the same in spaced operative relation. Preferably, the frame includes a pair of discs or plates 12 and 13 which are fixedly held in spaced relation by means of suitable spacing rods 14, 15 and 16. The front end of the housing or casing is closed by a transparent member 17 removably secured in position in any suitable manner, as for example, by a clamping ring 18. The casing is not sealed, but is left open to atmospheric pressure in any suitable manner, as by means of an opening 19 provided in the rear wall 9. If the instrument is to be used on aircraft the casing may have one end of a tube (not shown) connected to the opening 19 in any suitable manner, as by means of a nipple 20 secured to the wall 9 by means of a nut 21, the opposite end of the tube being led to a suitable point of static pressure so that the pressure inside of the casing 8 will be unaffected by motion of the aircraft and will vary solely in accordance with pressure changes due to changes in altitude.

The pressure-sensitive device, in the embodiment illustrated, is constituted by one or more aneroid capsules, such as for examples 22, 23 and 24. The upper surface of the capsule 24 is secured, as by means of brazing, to a threaded rod 25 adjustably secured to a transversely extending bar 26 (Fig. 3) as by means of locking nuts 27 and 28. The upper ends of the bar 26 may be attached in any suitable manner, as for example by soldering or brazing, to the upper surface of rods 15 and 16.

Means are provided for employing and amplifying the movements of the wall of the aneroid capsules 22, 23 and 24 due to changes in pressure to produce indications in terms of barometric pressure or of altitude in feet or meters. As illustrated, said means include a pair of links 29 and 30 pivotally connected together at 31, the link 30 being pivotally connected to the aneroid capsule 22 through a temperature compensation element 32 and a bracket 33, and the link 29 being rigidly connected to a rock-shaft 34 journaled at its inner end in an arm 35 which is secured in any suitable manner to the spacing rod 14, as for example, by brazing or soldering.

The rock-shaft 34 is also journaled intermediate its ends in the plate or disc 13 and at its other end in another and similar plate 36, the latter being positioned in the casing 8 intermediate the plate or disc 13 and a fourth plate or disc 37 secured to the interior of the casing in any suitable manner (not shown). The plates 13 and 36 are rigidly held in spaced relation in any suitable manner, as by means of spacing rods 38 and 39, and the plate 36 is in turn spaced from the plate 37 by means of spacing rods 40 and 41. The rock-shaft 34 has secured thereto, or formed integral therewith, a gear sector 42 which is arranged to mesh with a pinion 43 carried by a countershaft 44 having one end thereof journaled in the disc 13 and its other end journaled in the disc 36. Secured to, or formed integral with the shaft 44 is a relatively large gear 45 which meshes with a pinion 46 carried by another countershaft 47 which constitutes the mechanism staff and which is also journaled in the plates 13 and 36 and is drivably connected to the novel transmission of the invention, as will be pointed out more fully hereinafter. The other end of said novel transmission is drivably connected to a pointer shaft 48 which is journaled in the plate 37 and on which is carried a large pointer 49. The pointer 49 is arranged to traverse a dial 50 secured to the plate or disc 37 and upon which is engraved or etched a suitable scale 51 (Fig. 6) marked in hundreds of feet for example. Concentric with the scale 51 is another scale 52 which is graduated in thousands of feet and has cooperating therewith a small pointer 53.

In order that the small pointer 53 shall move with respect to its scale 52 and with the pointer 49 in the ratio existing between the scales 51 and 52, the pointers are geared together in such a manner that the pointer 53 moves only a fraction of a revolution for one complete revolution of pointer 49, and for this purpose a pinion 54 is secured to, or formed integral with the pointer shaft 48 and arranged to mesh with a gear 55 carried by a shaft 56 which is journaled in the plate 37 and in a bracket 57 carried by said plate. Secured to the gear 55 is a pinion 58 which meshes with a gear 59 carried by a hollow shaft 60 which is concentric with the large pointer shaft 48 and to which is secured the small pointer 53.

A hairspring 61 is also provided for preventing backlash in the gear train between the rock-shaft 34 and the mechanism staff 47 and has its outer end anchored to a pin 62 carried by the plate 36 and its inner end secured to the countershaft 44.

It will be apparent from the foregoing that, as the aneroid capsules 22, 23 and 24 are actuated by barometric pressures due to changes in pressure, the rock-shaft 34 is operated through the links 29 and 30 to cause movement of the gear sector 42, thereby operating the pointers 49 and 53 in the proper ratio through the gear-train 42, 43, 45, 46 through the novel transmission and through the gear train 54, 55, 58, 59.

It will also be apparent that the pointers 49 and 53 will indicate the altitude with respect to sea-level and not the true altitude with respect to the ground, i. e., the pointers would indicate zero only when the instrument is at sea-level under normal conditions and therefore it is desirable that the instrument be capable of adjustment to indicate zero when the instrument is on the ground regardless of the altitude of the ground with respect to sea-level.

It is further desirable that the instrument be capable of adjustment under one condition for a second condition and to indicate when the second condition occurs or is reached but without breaking the operative connections between the pointers and the expansible pressure-sensitive elements or aneroid capsules during the setting of the instrument for the preselected condition in order that said instrument may immediately and automatically indicate the true altitude upon completion of the setting operation. This may be accomplished, preferably though not necessarily, by rendering the aneroid capsules 22, 23 and 24 ineffective or inoperative during the time that the pointers are being rotated with respect to their scales to obtain the desired setting. For this purpose the novel transmission means mentioned above are provided to effect such an adjustment independently of the indicating action, and in the form shown comprise a planetary differential gear system through which relative movement may be caused between the pointers and their respective scales for setting the instrument so that the pointers will indicate zero when the instrument reaches the altitude for which it was set, and also through which the pointers may be operated by the pressure-responsive device during indicating action.

Means are also provided for holding the mechanism staff or driving shaft (shaft 47) of the differential system stationary while the setting is being made, but, if desired, such holding means may be dispensed with so that the setting action may be performed while the indicating action takes place, i. e., the pointers may be operated simultaneously by the setting means and the actuating device.

The planetary differential gear system is constituted by a pair of external planet gears 63 and 63a meshing with each other (Fig. 5) and carried by a pair of planet shafts 64 and 65 respectively, the former of which is journaled in a front plate 66 and a rear plate 67 in any suitable manner as by means of jeweled bearings 68 and 69. The other planet shaft 65 is also journaled in the plate 67 and in another plate 70, which is similar to the plate 66, in any suitable manner, as by means of jeweled bearings 71 and 72. Concentric with the planet shaft 64 and rigidly secured thereto and to the planet gear 63 on the rear face thereof there is provided a planet pinion 73 which is arranged to mesh with a sun gear 74 formed on a hollow hub 75 through which the mechanism staff 47 extends. A second planet pinion 76 is provided which is concentric with the planet shaft 65 and is secured to the planet gear 63a at the front face thereof. Said planet pinion 76 is arranged to be in constant mesh with a pinion 77 which is secured to or formed integral with the large pointer shaft 48.

Secured to the hollow hub 75, in any suitable manner, is a large gear 78 journaled on a cannon or bushing 79 rigidly secured to the plate 36. The large gear 78 constitutes a manually operated setting gear for setting the pointers through the planetary system, and for this purpose said gear is drivably connected to a pinion 80 carried by a sub-shaft 81 journaled in the plate 36. The pinion 81 in turn is in constant mesh with a relatively wide pinion 82 secured to a manually operated shaft 83 which is journaled and arranged for longitudinal movement in a wall 84 of an enlarged portion or extension 85 of the casing 8 formed at the bottom of the latter. Said shaft 83 is arranged to be moved longitudinally to the left and to be rotated from the front of the casing by means of a knurled knob 86 whereby the pointers 49 and 53 are actuated through the planetary gear system and the spur gear train 54, 55, 58, 59.

Referring to Figs. 1 and 5, it will be apparent that as the mechanism staff, i. e. the driving shaft 47 of the planet system, is actuated through the gears 42, 43, 45 and 46 by the rocking movement of the rock-shaft 34 it will cause the plate 67 to rotate therewith by virtue of a connection between the shaft and plate provided by a frame 87 which is secured to the shaft 47 and which also carries the plates 66, 67 and 70. Upon rotation of the plate 67 the planet gear 63 will also be caused to revolve about the axis of the shaft 47 thereby revolving the planet pinion 73 in its bearings 68 and 69 about the sun gear 74 since the latter is at this time stationary by virtue of the constant mesh between the setting gear 78 and the pinion 82 (Fig. 1), the latter being prevented from rotation by means of a stationary gear tooth 88 fixed to the bottom wall 89 of the enlarged portion 85 of the casing 8. As the planet gear 63 revolves about the axis of the shaft 47 and the planet pinion 73 revolves about the sun gear 74 with its shaft 64, the planet pinion 76 is also revolved therewith in its bearings 71 and 72, and since the planet 76 is in mesh with the pinion 77 it drives the latter, thereby rotating the large pointer shaft 48 to operate the large pointer 49 and also the small pointer 53 through the interconnected gear train provided between said pointers.

In order to prevent the mechanism shaft 47 from actuating the pointers during the setting action there are provided novel means embodying a brake mechanism which is rendered effective upon a longitudinal movement of the manually operated shaft 83, in the present instance to the left as viewed in Fig. 1, to hold said shaft against rotation. Said brake mechanism is constituted by a brake member in the form of a disc 90 rigidly carried by the shaft 47, and a cooperating brake or friction member 91 carried by a resilient member 92 secured to the bottom wall 89 of the casing extension 85 in any suitable manner, as by means of screws 93 and 94. Normally the movable brake or friction member 91 does not engage the brake disc 90 but is arranged to do so upon longitudinal movement of the shaft 83 to the left against the compression of a coil spring 95 located in a recess formed in the casing extension 85 and by means of a rod or pin 96 which cooperates with the spring 95 to maintain the resilient member or spring 92 in normal position, but upon such longitudinal movement of the shaft 83 and the pin 96 against the compression of the spring 95 the spring 92 is caused to bear against the wedge member 97, thereby causing it to bend, as indicated in Fig. 4, so that the movable brake member 91 is caused to bear against the brake disc 90 thereby holding the latter and preventing rotation of the shaft 47. At the same time that the brake mechanism is operated the pinion 82 is disengaged from the fixed tooth 88 so that the shaft 83 may be rotated by means of the knob 86 thereby rotating the setting gear 78 through the intermediate pinion 80. By referring again to Fig. 5 it will be seen that as the setting gear 78 is rotated and the shaft 47 held stationary by the brake mechanism previously described the hub 75 will also rotate, thus causing the sun gear 74 to drive the planet pinion 73 and the planet shaft 64 and hence cause the planet gear 63 to rotate therewith in the bearings 68 and 69. Such rotation of the planet gear 63 causes the planet pinion 76, by means of the gear 63a, to rotate with its shaft 65 in bearings 71 and 72, thereby driving the pointer shaft pinion 77 in the same manner as when the instrument is indicating and thus operating the pointers 49 and 53 so that they may be pre-set to give a desired indication when a predetermined altitude is reached. However, as pointed out hereinbefore, the brake disc 90 and the movable brake member 91 and, hence, the wedge member 97, may be dispensed with without impairing the setting and/or indicating actions of the instrument. The desirable feature of the invention is constituted in the provision of the novel transmission means between the pointers and the actuating device, including the novel planetary differential gear system whereby the indicating action and the setting action of the pointers may be accomplished through the same transmission means. Obviously, by virtue of the differential gear being interposed in the transmission system, both actions may take place simultaneously and, therefore, though it may be desirable, it is not absolutely essential that the brake means be employed.

It will be seen from the foregoing that by virtue of the planetary differential gear system and of the braking mechanism, the operative connections between the pressure-sensitive device and the pointers are not broken during setting of the instrument for a predetermined altitude but the pressure-sensitive device is rendered ineffective to actuate the pointers during the setting operation. It is also apparent that the indicating action and the setting action of the pointers are accomplished through the same transmission means, namely the novel planetary differential gear system.

When the instrument has been set to give a predetermined reading for a preselected altitude it is desirable that means be provided for indicating said selected altitude and that this indication be undisturbed during normal function of the instrument while the same is being moved to the preselected altitude in the case of instruments of other types to which the invention may be applied. To this end means are provided whereby the indication of the desired condition or altitude for which the instrument is set is produced simultaneously with the rotation of the pointers and while the pressure-sensitive device is rendered ineffective. In the form shown said means comprise a counter 98 carried by the plate 37 and arranged so that the number-carrying dials thereof are visible through an opening 99 provided in the dial 50 at any convenient point, as for example just below the scale 52.

The number-carrying dials of the counter, which in the present instance are marked in feet, are actuated simultaneously with the setting of the pointers by means of the knob 86 through the pinion 100 carried by a shaft 101 journaled in the plate 36 adjacent the setting gear 78 so that the latter may mesh therewith and cause rotation thereof when said setting gear is rotated. At the free end of shaft 101 there is provided a bevel pinion 102 which is in constant mesh with a bevel gear 103 provided on the same shaft which carries the number-carrying dials of the counter for actuating the latter.

It will be apparent from the foregoing that when the knob 86 is actuated to the left, as viewed in Fig. 1, and rotated to adjust the instrument for a desired condition, the mechanism shaft 47 is locked against rotation by means of the brake-mechanism 91 described above, and hence the pressure-sensitive device is rendered inoperative and relative movement is simultaneously caused between the pointers and their respective scales through the planetary differential gear system by the operation of the setting gear 78 so that a predetermined relation is established between the pointers and scales whereby a desired indication is produced when the preselected condition or altitude occurs or is reached. Simultaneously with the actuation of the pointers by means of the knob 86 the counter 98 is also operated through the pinion 100 and bevel gears 102, 103 to indicate the condition for which the instrument has been set. The knob 83 is then released and by the action of the spring 95 and pin 96, the shaft 83 is caused to be moved to the right as viewed in Fig. 1, thereby releasing the brake mechanism, and thereafter the pointers are operated independently of the counter through the planetary differential gear system by the rotation of the interconnecting frame 87 effected by the operation of the shaft 47 to produce the required indication on the scales 51 and 52 when the condition for which the instrument has been set occurs or has been reached, and which condition has been indicated on the counter 98 through the window 99. The setting of the counter, however, remains unchanged during the indicating action of the pointers and until the instrument is again adjusted by means of the knob 86.

Referring to Fig. 6, there is illustrated an indication, by the pointers 49 and 53, of zero altitude with respect to ground, the latter being at a sea-level altitude of 2,000 feet as shown by the reading on the counter, i. e. the altimeter has been pre-set for a pressure-level altitude of 2,000 feet and the pointers now indicate that that altitude has been reached.

In Fig. 7, on the other hand, the instrument, as illustrated, indicates, by the pointers, an altitude of 3,200 feet above the pressure-level altitude of 2,000 feet shown by the counter or, in other words, the altitude with respect to sea-level is the sum of the pressure-level altitudes of 2,000 feet and the pointer indication of 3,200 feet or a total of 5,200 feet above sea-level.

There is thus provided a novel indicating instrument which may be set under one condition for a second condition so that it will indicate when the second condition occurs or is reached and which also indicates the condition for which it has been set, independently of the indicating action of the instrument but through the same transmission mechanism, and as pointed out hereinbefore, the invention is particularly suitable for use in a sensitive altimeter whereby the party may set his instrument at a flying field having one pressure-level altitude so that it will indicate zero when he reaches a second flying field whose pressure-level altitude is different from that of the first flying field and which altitude can be set into the instrument as a positive indication.

There is also provided a novel altimeter which is adapted for ready installation and inexpensive manufacture and one which will indicate at all times the true altitude, and which may be set in advance to indicate the preselected objective. A preselected altitude indication is maintained without interference of the normal operation of the altimeter, and the latter may be adjusted without disturbing or breaking the operative connections between the pressure sensitive device and the pointers.

Although only one embodiment of the invention has been illustrated and described, various changes and modifications, which will now appear to those skilled in the art, may be made in the details of construction and arrangement of parts without departing from the scope of the invention. For example, the counter may be replaced by any other type of indicator which is adapted for simultaneous action by the setting knob when the adjustment is made between the pointers and scales. It is also obvious that the reference scale or counter and the indicating scales 51 and 52 may be calibrated in any suitable units depending upon the purpose for which the instrument is to be utilized. Also, as previously indicated, the means for rendering the actuating device ineffective during setting may be dispensed with, if desired, so that the setting and indicating actions may take place simultaneously. As will be understood by those skilled in the art, the invention is not limited to an altimeter since, as has been pointed out, certain novel features thereof are applicable to a plurality of indicating instruments and, reference therefore, will be had primarily to the appended claims for a definition of the limits of the invention.

What is claimed is:

1. In an indicating instrument, the combination of pointer means, scale means, an actuating device responsive to changes in conditions or operations, transmission means for operating said pointer means upon operation of said actuating device for indicating action, means included in said transmission means for causing relative movement between the scale means and pointer means during indicating action and during setting of the instrument for a predetermined condition so that the pointer means will give a desired indication when said condition occurs or is reached, said means including a driving member adapted to be operated by said actuating device, a driven member operatively connected to said pointer means, and a differential gear system interconnecting said driving and driven members, means for manually actuating said gear system for operating said driven member to actuate said pointer means, means for simultaneously holding said driving member against rotation to render said actuating device ineffective for indicating action during setting of the instrument, and means simultaneously operable with said manual actuating means for indicating the condition for which the instrument is set.

2. In an indicating instrument, the combination of pointer means, scale means, an actuating device responsive to changes in conditions or operations, transmission means for operating said pointer means upon operation of said actuating device for indicating action, means included in said transmission means for causing relative movement between the scale means and pointer means during indicating action and during setting of the instrument for a predetermined condition so that the pointer means will give a desired indication when said condition occurs or is reached, said means including a driving member adapted to be operated by said actuating device, a driven member operatively connected to said pointer means, and a differential gear system interconnecting said driving and driven members, means for manually actuating said gear system for operating said driven member to actuate said pointers, means for simultaneously holding said driving member against rotation to render said actuating device ineffective for indicating action during setting of the instrument, and means independent of said scale means and simultaneously operable with said manual actuating means for indicating the condition for which the instrument is set.

3. In an indicating instrument, the combination of pointer means, scale means, an actuating device responsive to changes in conditions or operations, transmission means for operating said pointer means upon operation of said actuating device for indicating action, means including a differential mechanism in said transmission means for causing relative movement between the scale means and pointer means during indicating action and during setting of the instrument for a predetermined condition so that said pointer means will give a desired indication when said condition occurs or is reached, means for manually actuating said last mentioned means for setting the instrument and for simultaneously rendering said actuating device ineffective during such setting, while maintaining a constant connection between said actuating device and the transmission means, and means simultaneously operable with said manual actuating means for indicating the condition for which the instrument is set.

4. In an indicating instrument, the combination of pointer means, scale means, an actuating device responsive to changes in conditions or operations, transmission means for operating said pointer means upon operation of said actuating device for indicating action, means including a differential mechanism in said transmission means for causing relative movement between the scale means and pointer means during indicating action and during setting of the instrument for a predetermined condition so that pointer means will give a desired indication when said condition occurs or is reached, means for manually actuating said last mentioned means for setting the instrument and for simultaneously rendering said actuating device ineffective during such setting, while maintaining a constant connection between said actuating device and the transmission means, and means independent of the scale means and simultaneously operable with said manual actuating means for indicating the condition for which the instrument is set.

5. In an indicating instrument, the combination of pointer means, scale means, an actuating device responsive to changes in conditions or operations, transmission means for operating said pointer means upon operation of said actuating device for indicating action, a differential gear system included in said transmission means for causing relative movement between the pointer means and the scale means during indicating action and during setting of the instrument for a predetermined condition so that said pointer means will give a desired indication when said condition occurs or is reached, and means for manually actuating said differential gear system to set the instrument and for simultaneously rendering said actuating device ineffective during such setting while maintaining a constant connection between said actuating device and the transmission means.

6. In an indicating instrument having pointer and scale means and an actuating device responsive to changes in conditions for operating said pointer means to indicate such changes, and means for setting the instrument for a predetermined condition so that said pointer means will give a desired indication when said condition occurs, said setting means including a differential gear system drivably connecting said actuating device and pointer means whereby the latter may be operated separately by said setting means and said actuating device.

7. In an indicating instrument having pointer and scale means and an actuating device responsive to changes in conditions for operating said pointer means to indicate such changes, means for setting the instrument for a predetermined condition, said setting means including a planetary differential gear system drivably connecting said actuating device and said pointer means whereby the latter may be operated separately by said actuating device and said setting means.

8. In an indicating instrument including a casing, pointer and scale means and an actuating device rigidly secured to said casing and responsive to changes in conditions for operating said pointer means to indicate such changes on said scale means, means for setting the instrument for a predetermined condition and including a differential gear system drivably connecting said actuating device and said pointer means whereby relative movement is produced between the latter and the scale means separately by said actuating device and said setting means.

9. In an indicating instrument having pointer and scale means and an actuating device responsive to changes in conditions for operating said pointer means to indicate such changes on said scale means, means for setting the instrument for a predetermined condition and including a differential gear system drivably connecting said actuating device and said pointer means whereby relative movement is produced between the latter and the scale means separately by said actuating device and said setting means.

10. In an indicating instrument having pointer and scale means and an actuating device responsive to changes in conditions for operating said pointer means to indicate such changes on said scale means, means for setting the instrument for a predetermined condition so that the pointer means will give a desired indication when said condition occurs, said setting means including a differential gear system drivably connecting said actuating device and said pointer means whereby relative movement is produced between the latter and the scale means separately by said actuating device and said setting means, and means for rendering said actuating device ineffective for indicating action during the setting action, and means simultaneously operable with said setting means for indicating the condition for which the instrument is set.

11. In an indicating instrument having pointer and scale means and an actuating device responsive to changes in conditions for operating said pointer means to indicate such changes on said scale means, means for setting the instrument for a predetermined condition so that the pointer means will give a desired indication when said condition occurs, said setting means including a differential gear system drivably connecting said actuating device and said pointer means whereby relative movement is produced between the latter and the scale means separately by said actuating device and said setting means, and means for rendering said actuating device ineffective for indicating action during the setting action, and means independent of said scale means and simultaneously operable with said setting means for indicating the condition for which the instrument is set.

12. In an indicating instrument including a casing, pointer and scale means and an actuating device rigidly secured to said casing and responsive to changes in conditions for operating said pointer means to indicate such changes on said scale means, means for setting the instrument for a predetermined condition so that said pointer means will give a desired indication when said condition occurs, said setting means including a differential gear system drivably connecting said actuating device and said pointer means whereby relative movement is produced between the latter and the scale means separately by said actuating device and said setting means, and means simultaneously operable with said setting means for indicating the condition for which the instrument is set.

13. In an indicating instrument having pointer and scale means and an actuating device responsive to changes in conditions for operating said pointer means to indicate such changes on said scale means, a differential gear system drivably connecting said actuating device and said pointer means and adapted to cause relative movement between the latter and the scale means during indicating action and during setting of the instrument for a predetermined condition, manually operable means for operating said differential gear system to set the instrument and having constant connection therewith, means for preventing operation of said actuating device during setting, while maintaining the connection between said actuating device and said gear system, and means for preventing operation of said setting means during indicating action.

14. In an indicating instrument having pointer and scale means and an actuating device responsive to changes in conditions for operating said pointer means to indicate such changes on said scale means, a differential gear system drivably connecting said actuating device and said pointer means and adapted to cause relative movement between the latter and the scale means during indicating action and during setting of the instrument for a predetermined condition, manually operable means for operating said differential gear system to set the instrument and having constant connection therewith, means for preventing operation of said actuating device during setting, while maintaining the connection between said actuating device and said gear system, means for preventing operation of said setting means during indicating action, and means simultaneously operated with said manually operable means for indicating the predetermined condition for which the instrument is set.

15. In an indicating instrument having pointer and scale means and an actuating device responsive to changes in conditions for operating said pointer means to indicate such changes on said scale means, a differential gear system drivably connecting said actuating device and said pointer means and adapted to cause relative movement between the latter and the scale means during indicating action and during setting of the instrument for a predetermined condition, manually operable means for operating said differential gear system to set the instrument and having constant connection therewith, means for preventing operation of said actuating device during setting, while maintaining the connection between said actuating device and said gear system, means for preventing operation of said setting means during indicating action, and means independent of said scale means and simultaneously operated with said manually operable means for indicating the predetermined condition for which the instrument is set.

16. In a sensitive altimeter having a plurality of pointers and cooperating scales and a pressure-sensitive device for operating said pointers in accordance with changes in altitude, a rock-shaft adapted to be actuated by said pressure-sensitive device, a pointer operating shaft, means for setting the altimeter for a predetermined altitude, a differential gear system drivably connecting said rock-shaft and pointer operating shaft whereby relative movement may be produced between said pointers and scales separately by the operation of said rock-shaft and said setting means, means for preventing actuation of said rock-shaft by said pressure-sensitive device while setting the altimeter but maintaining the connection between said rock-shaft and said differential gear system, and means for preventing operation of said setting means during indicating action of the instrument.

17. In an altimeter having a pointer, a scale and a pressure-sensitive device for operating the pointer in accordance with changes in altitude, a rock-shaft adapted to be actuated by said pressure-sensitive device, a pointer shaft, means for setting the altimeter for a predetermined altitude, a planetary differential gear train drivably connecting said rock-shaft and pointer shaft whereby relative movement may be produced between the pointer and scale separately by the operation of said rock-shaft and said setting means, said gear train comprising a pair of planet gears in constant mesh with each other, a planet pinion carried by each of said gears and rotatable therewith, a frame on which said planet gears and pinions are journaled, an operating shaft drivably connected to and actuated by said rock-shaft and rigidly connected to said frame for rotating the latter, a pinion adapted to be operated by said setting means and in constant mesh with one of said planet pinions, a second pinion carried by the pointer shaft and in constant mesh with the other of said planet pinions, means simultaneously operable with said setting means for holding said planet frame against rotation and rendering said pressure sensitive device ineffective to actuate said rock-shaft whereby said setting means causes relative movement between the pointer and scale through said planet pinions and gears, and means for holding said setting means during indicating action whereby said rock-shaft causes the planet frame to rotate and thus drive the pointer shaft through said planet pinions and gears during indicating action.

18. In an altimeter having a pointer, a scale and a pressure-sensitive device for operating the pointer in accordance with changes in altitude, a rock-shaft adapted to be actuated by said pressure-sensitive device, a pointer shaft, means for setting the altimeter for a predetermined altitude, a planetary differential gear train drivably connecting said rock-shaft and pointer shaft whereby relative movement may be produced between the pointer and scale separately by the operation of said rock-shaft and said setting means, said gear train comprising a pair of planet gears in constant mesh with each other, a planet pinion carried by each of said gears and rotatable therewith, a frame on which said planet gears and pinions are journaled, an operating shaft drivably connected to and actuated by said rock-shaft and rigidly connected to said frame for rotating the latter, a pinion adapted to be operated by said setting means and in constant mesh with one of said planet pinions, a second pinion carried by the pointer shaft and in constant mesh with the other of said planet pinions, means simultaneously operable with said setting means for holding said planet frame against rotation and rendering said pressure-sensitive device ineffective to actuate said rock-shaft whereby said setting means causes relative movement between the pointer and scale through said planet pinions and gears, means for holding said setting means during indicating action whereby said rock-shaft causes the planet frame to rotate and thus drive the pointer shaft through said planet pinions and gears during indicating action, and means also simultaneously operable with said setting means for indicating the predetermined altitude for which the altimeter is set.

19. In an altimeter having a pointer, a scale and a pressure-sensitive device for operating the pointer in accordance with changes in altitude, a rock-shaft adapted to be actuated by said pressure-sensitive device, a pointer shaft, means for setting the altimeter for a predetermined altitude, a planetary differential gear train drivably connecting said rock-shaft and pointer shaft whereby relative movement may be produced between the pointer and scale separately by the operation of said rock-shaft and said setting means, said gear train comprising a pair of planet gears in constant mesh with each other, a planet pinion carried by each of said gears and rotatable therewith, a frame on which said planet gears and pinions are journaled, an operating shaft drivably connected to and actuated by said rock-shaft and rigidly connected to said frame for rotating the latter, a pinion adapted to be operated by said setting means and in constant mesh with one of said planet pinions, a second pinion carried by the pointer shaft and in constant mesh with the other of said planet pinions, means simultaneously operable with said setting means for holding said planet frame against rotation and rendering said pressure-sensitive device ineffective to actuate said rock-shaft whereby said setting means causes relative movement between the pointer and scale through said planet pinions and gears, means for holding said setting means during indicating action whereby said rock-shaft causes the planet frame to rotate and thus drive the pointer shaft through said planet pinions and gears during indicating action, and means independent of the scale and also simultaneously operable with said setting means for indicating the predetermined altitude for which the altimeter is set.

20. In an indicating instrument, the combination of pointer means, scale means, an actuating device responsive to changes in conditions or operations, transmission means for operating said pointer means upon operation of said actuating device for indicating action, means included in said transmission means for causing relative movement between the scale means and pointer means during indicating action and during setting of the instrument for a predetermined condition so that the pointer means will give a desired indication when said condition occurs or is reached, said means including a driving member adapted to be operated by said actuating device, a driven member operatively connected to said pointer means, and a differential gear system interconnecting said driving and driven members, means for manually actuating said gear system for operating said driven member to actuate said pointer means, and means simultaneously operable with said manual actuating means for indicating the condition for which the instrument is set.

21. In an indicating instrument, the combination of pointer means, scale means, an actuating device responsive to changes in conditions or operations, transmission means for operating said pointer means upon operation of said actuating device for indicating action, means included in said transmission means for causing relative movement between the scale means and pointer means during indicating action and during setting of the instrument for a predetermined condition so that the pointer means will give a desired indication when said condition occurs or is reached, said means including a driving member adapted to be operated by said actuating device, a driven member operatively connected to said pointer means, and a differential gear system interconnecting said driving and driven members, means for manually actuating said gear system for operating said driven member to actuate said pointer means, and means independent of said scale means and simultaneously operable with said manual actuating means for indicating the condition for which the instrument is set.

22. In an indicating instrument, the combination of pointer means, scale means, an actuating device responsive to changes in conditions or operations, transmission means for operating said pointer means upon operation of said actuating device for indicating action, means including a differential mechanism in said transmission means for causing relative movement between the scale means and pointer means during indicating action and during setting of the instrument for a predetermined condition so that said pointer means will give a desired indication when said condition occurs or is reached, means for manually actuating said last-mentioned means for setting the instrument while maintaining a constant connection between said actuating device and the transmission means, and means simultaneously operable with said manual actuating means for indicating the condition for which the instrument is set.

23. In an indicating instrument, the combination of pointer means, scale means, an actuating device responsive to changes in conditions or operations, transmission means for operating said pointer means upon operation of said actuating device for indicating action, means including a differential mechanism in said transmission means for causing relative movement between the scale means and pointer means during indicating action and during setting of the instrument for a predetermined condition so that said pointer means will give a desired indication when said condition occurs or is reached, means for manually actuating said last-mentioned means for setting the instrument while maintaining a constant connection between said actuating device and the transmission means, and means independent of the scale means and simultaneously operable with said manual actuating means for indicating the condition for which the instrument is set.

24. In an indicating strument, the combination of pointer means, scale means, an actuating device responsive to changes in conditions or operations, transmission means for operating said pointer means upon operation of said actuating device for indicating action, a differential gear system included in said transmission means for causing relative movement between the pointer means and the scale means during indicating action and during setting of the instrument for a predetermined condition so that the pointer means will give a desired indication when said condition occurs or is reached, and means for manually actuating said differential gear system to set the instrument while maintaining a constant connection between said actuating device and the transmission means.

25. In an indicating instrument having pointer and scale means and an actuating device responsive to changes in conditions for operating said pointer means to indicate such changes, means for setting the instrument for a predetermined condition so that said pointer means will give a desired indication when said condition occurs, said setting means including a differential gear system drivably connecting said actuating device and pointer means whereby the latter may be operated by said setting means and said actuating device.

26. In an indicating instrument having pointer and scale means and an actuating device responsive to changes in conditions for operating said pointer means to indicate such changes, means for setting the instrument for a predetermined condition, said setting means including a planetary differential gear system drivably connecting said actuating device and said pointer means whereby the latter may be operated by said actuating device and said setting means.

27. In an indicating instrument including a casing, pointer and scale means and an actuating device rigidly secured to said casing and responsive to changes in conditions for operating said pointer means to indicate such changes on said scale means, means for setting the instrument for a predetermined condition and including a differential gear system drivably connecting said actuating device and said pointer means whereby relative movement may be produced between the latter and the scale means by said actuating device and said setting means.

28. In an indicating instrument having pointer and scale means and an actuating device responsive to changes in conditions for operating said pointer means to indicate such changes on said scale means, means for setting the instrument for a predetermined condition and including a differential gear system drivably connecting said actuating device and said pointer means whereby relative movement may be produced between the latter and the scale means by said actuating device and said setting means.

29. In an indicating instrument including a casing, pointer and scale means, and an actuating device rigidly secured to said casing and responsive to changes in conditions for operating said pointer means to indicate such changes on said scale means, means for setting the instrument for a predetermined condition so that said pointer means will give a desired indication when said condition occurs, said setting means including a differential gear system drivably connecting said actuating device and said pointer means whereby relative movement may be produced between the latter and the scale means by said actuating device and said setting means, and means simultaneously operable with said setting means for indicating the condition for which the instrument is set.

30. In an indicating instrument having pointer and scale means and an actuating device responsive to changes in conditions, transmission means drivably connecting said actuating device and pointer means for operating the latter to indicate such changes, and means for setting the instrument for a predetermined condition so that said pointer means will give a desired indication when said condition occurs, said setting means including differential means in said transmission and forming a part thereof so that said pointer means may be operated during setting and indicating action.

31. In an indicating instrument having pointer and scale means and an actuating device responsive to changes in conditions, transmission means drivably connecting said actuating device and pointer means for operating the latter to indicate such changes, and means for setting the instrument for a predetermined condition so that said pointer means will give a desired indication when said condition occurs, said setting means including differential means in said transmission and forming a part thereof so that said pointer means may be operated during setting and indicating action, and means simultaneously operable during setting for indicating the condition for which the instrument is set.

32. In an indicating instrument the combination of pointer means, scale means, an actuating device responsive to changes in conditions or operations, transmission means for operating said pointer means upon operation of said actuating device for indicating action, means including a planetary gear system in said transmission means and forming a part thereof for causing relative movement between the scale means and pointer means during indicating action and during setting of the instrument for a predetermined condition so that said pointer means will give a desired indication when said condition occurs or is reached, means for manually actuating said last-mentioned means for setting the instrument while maintaining a constant connection between said actuating device and the transmission means, and means simultaneously operable with said manual actuating means for indicating the condition for which the instrument is set.

33. In an indicating instrument, the combination of pointer means, scale means, an actuating device responsive to changes in conditions or operations, transmission means for operating said pointer means upon operation of said actuating device for actuating action, means including a planetary gear train in said transmission means and forming a part thereof for causing relative movement between the scale means and pointer means during indicating action and during setting of the instrument for a predetermined condition so that said pointer means will give a desired indication when said condition occurs or is reached, means for manually actuating said last-mentioned means for setting the instrument while maintaining a constant connection between said actuating device and the transmission means, and means independent of the scale means and simultaneously operable with said manual actuating means for indicating the condition for which the instrument is set.

34. In an indicating instrument, the combination of pointer means, scale means, an actuating device responsive to changes in conditions or operations, transmission means for operating said pointer means upon operation of said actuating device for indicating action, a planetary gear train included in said transmission means and forming a part thereof for causing relative movement between the pointer means and the scale means during indicating action and during setting of the instrument for a predetermined condition so that said pointer means will give a desired indication when said condition occurs or is reached, and means for manually actuating said planetary gear train to set the instrument while maintaining a constant connection between said actuating device and the transmission means.

35. In an indicating instrument having a pointer and scale means and an actuating device responsive to changes in conditions for operating said pointer means to indicate such changes, means for setting the instrument for a predetermined condition, said setting means including a planetary gear train drivably connecting said actuating device and said pointer means whereby the latter may be operated by said actuating device and said setting means.

36. In an indicating instrument including a casing, pointer and scale means, and an actuating device rigidly secured to said casing and responsive to changes in conditions for operating said pointer means to indicate such changes on said scale means, means for setting the instrument for a predetermined condition and including a planetary gear train drivably connecting said actuating device and said pointer means whereby relative movement may be produced between the latter and the scale means by said actuating device and said setting means.

37. An altimeter comprising a dial having a circular indicating scale, aneroid means, a spindle rotatable by said aneroid means, a casing having provisions for holding said aneroid means stationary relatively thereto, a pointer concentrically rotatable relatively to said scale, planetary gearing interconnecting said spindle with said pointer whereby the latter is actuated by the former upon expansion and contraction of said aneroid means due to changes in barometric pressure, and means for revolving the axis of one of the planet gears of said planetary gearing about said spindle to effect a setting movement of the pointer relatively to the scale for setting the altimeter for a predetermined barometric pressure or altitude whereby said pointer will indicate zero when said predetermined barometric pressure occurs or said predetermined altitude is reached.

38. An altimeter comprising a dial having a circular indicating scale, aneroid means, a spindle rotatable by said aneroid means, a casing having provisions for holding said aneroid means stationary relatively thereto, a pointer concentrically rotatable relatively to said scale, planetary gearing interconnecting said spindle with said pointer whereby the latter is actuated by the former upon expansion and contraction of said aneroid means due to changes in barometric pressure, means for revolving the axis of one of the planet gears of said planetary gearing about said spindle to effect a setting movement of the pointer relatively to the scale for setting the altimeter for a predetermined barometric pressure or altitude whereby said pointer will indicate zero when said predetermined barometric pressure occurs or said predetermined altitude is reached, and means simultaneously operable with said last-named means for indicating the barometric pressure or altitude for which the altimeter is set.

39. An altimeter comprising a dial having a circular indicating scale, aneroid means, a spindle rotatable by said aneroid means, a casing having provisions for holding said aneroid means stationary relatively thereto, a pointer concentrically rotatable relatively to said scale, planetary gearing interconnecting said spindle with said pointer whereby the latter is actuated by the former upon expansion and contraction of said aneroid means due to changes in barometric pressure, and means having a continuous connection with said planetary gearing for revolving the axis of one of the planet gears of said planetary gearing about said spindle to effect a setting movement of said pointer relatively to said scale for setting the altimeter for a predetermined barometric pressure or altitude whereby said pointer will indicate zero when said predetermined barometric pressure occurs or said predetermined altitude is reached.

40. An altimeter comprising a dial having a circular indicating scale, aneroid means, a spindle rotatable by said aneroid means, a casing having provisions for holding said aneroid means stationary relatively thereto, a pointer concentrically rotatable relatively to said scale, planetary gearing interconnecting said spindle with said pointer whereby the latter is actuated by the former upon expansion and contraction of said aneroid means due to changes in barometric pressure, means having a continuous connection with said planetary gearing for revolving the axis of one of the planet gears of said planetary gearing about said spindle to effect a setting movement of said pointer relatively to said scale for setting the altimeter for a predetermined barometric pressure or altitude whereby said pointer will indicate zero when said predetermined barometric pressure occurs or said predetermined altitude is reached, and means simultaneously operable with said last-named means for indicating the barometric pressure or altitude for which the altimeter is set.

41. An altimeter comprising a dial having a circular indicating scale; aneroid means; a spindle rotatable by said aneroid means; a casing having provisions for holding said aneroid means stationary relatively thereto; a pointer concentrically rotatable relatively to said scale; planetary gearing interconnecting said spindle with said pointer; and means for revolving the axis of one of the planet gears of said planetary gearing about said spindle to effect a setting adjustment of said pointer relatively to said scale.

42. An altimeter comprising an atmospheric pressure sensitive device having a plurality of indicating elements movable in different degrees; a planetary gearing coacting with said indicating elements; means for obtaining reference altitude indications; and setting means, said planetary gearing so coacting with said indicating elements and said setting means being so coordinated with said planetary gearing and the reference means as to cause setting changes in indications of said indicating elements and said reference means such that the sums of said changes are maintained equal to zero.

43. A device including an altimeter having a plurality of indicating elements, means responsive to atmospheric pressure, actuating means controlled thereby for causing a movement of said elements in different degrees, a second actuating means associated in planetary relation with the first mentioned actuating means, reference means including a barometric indicating means, and setting means for operating the reference means and the second actuating means so that the sums of equivalent setting changes of the reference means and said elements are maintained equal to zero, with the indicating elements being movable by the setting means in different degrees.

44. An altimeter including an indicating element, a scale element graduated in units corresponding to barometric pressures and associated with the indicating element for relative movement therebetween, a reference means adapted for setting, atmospheric pressure responsive actuating means for moving one of the two first mentioned elements for normal indicating action, said elements being movable relatively to each other for setting, and setting means for moving the reference means and the element movable by the actuating means, the setting means including a planetary gear train engaged with the actuating means so that the element movable by the actuating means is movable alone for normal indicating action.

45. An altimeter including a scale element, an indicating element, the scale element and indicating element being associated for relative movement therebetween, a reference means, said reference means and scale element reading according to values corresponding to barometric pressures, means including an atmospheric pressure responsive member for moving one of the two first mentioned elements, a planetary gearing engaged with the second mentioned means, and a unitary means for moving the reference means and the planetary gearing, whereby the element movable by the second mentioned means is movable thereby independently of the reference means.

46. An altimeter including a scale element, an indicating element, a reference indicating means, the scale element reading according to values corresponding to barometric pressures, means including an atmospheric pressure responsive means for moving the indicating element, mechanism including a planetary gearing interengaging two of the three first mentioned elements, and means for actuating the reference indicating means and said mechanism such that one of the two first mentioned elements is movable by the pressure responsive means independently of the reference indicating means.

47. An altimeter including an indicating element, a scale element graduated in units corresponding to barometric pressures, a reference means adapted for setting, means responsive to atmospheric pressure, means operated thereby for causing a relative movement between the indicating element and the scale element, said elements being movable relatively to each other for setting, and setting means including a planetary gearing coacting with the operated means and reference means, said planetary gearing being so coordinated with the operated means that one of the two first mentioned elements is movable by the operated means independently of the reference means, and the reference means and the independently movable element are settable as a unit by the setting means without affecting the pressure responsive means.

48. An indicating instrument comprising a device responsive to changes in conditions to be indicated, means supporting said device, actuator means including a member rotatably associated with said supporting means, a shaft operated by said change responsive device and journaled in said rotatable member and being revolvable therewith about the axis of said member while said change responsive device remains bodily stationary and in addition to being rotatable on its own axis relative to said member, indicating means rotatably carried by the supporting means and operatively connected by the shaft to the change responsive device, and means to cause relative movement between said device and said rotatable member for operating the indicating means by said shaft to set the instrument for a predetermined condition.

49. An indicating instrument comprising a device responsive to changes in conditions to be indicated, means supporting said device, actuator means including a member rotatably associated with said supporting means, a shaft operated by said change responsive device and journaled in said rotatable member and being revolvable therewith about the axis of said member while said change responsive device remains bodily stationary and in addition to being rotatable on its own axis relative to said member, indicating means rotatably carried by the supporting means and operatively connected by the shaft to the change responsive device, means to cause relative movement between said device and said rotatable member for operating the indicating means by said shaft to set the instrument for a predetermined condition, and reference indicating means separate from but operable with said first indicating means during setting for indicating the predetermined condition for which the instrument has been set.

50. An altimeter comprising a pressure-responsive device, means supporting said device, actuator means including a member rotatably mounted on said supporting means, a shaft operated by said pressure-responsive device and journaled in said rotatable member and being revolvable therewith about the axis of said member while said pressure-responsive device remains bodily stationary and in addition to being rotatable on its own axis relative to said member, indicating means rotatably carried by the supporting means and operatively connected by the shaft to the pressure-responsive device, means to cause relative movement between said pressure-responsive device and said rotatable member for operating the indicating means by said shaft to set the altimeter for a predetermined altitude or barometric pressure, and reference indicating means separate from but operable with said first indicating means during setting for indicating the predetermined altitude or barometric pressure for which the altimeter has been set.

51. In an indicating instrument having a pair of pointers, a reference indicating means, scales for the pointers, a device responsive to changes in conditions to be indicated, gear means connecting the pointers to the device for actuating said pointers in a predetermined ratio according to their scales, the combination with said instrument of setting means to cause a simultaneous change of the indication of the pointer means and of the reference indicating means, said setting means comprising a relatively fixed support, actuating means including means for operating said reference indicating means, a member rotatably carried by the relatively fixed support, a shaft journaled in said rotatable member and revolvable therewith about the axis of said member while said change responsive device and said support remain stationary and in addition to being rotatable on its own axis relative to said member and carrying a portion of the said gear means which connects the pointers to the change responsive device, and a knob for operating the actuating means from the exterior of the instrument.

52. In an altimeter having a pair of pointers, a reference indicating means, scales for the pointers, a pressure-responsive device responsive to changes in altitude, gear means connecting the pointers to the pressure-responsive device for actuating said pointers in a predetermined ratio according to their scales, the combination of setting means to cause a simultaneous change of the indication of the pointer means and of the reference indicating means, said setting means comprising a relatively fixed support, actuating means including means for operating said reference indicating means, a member rotatably carried by the relatively fixed support, a shaft journaled in said rotatable member and revolvable therewith about the axis of said member while said pressure-responsive device and said support remain stationary and in addition to being rotatable on its own axis relative to said member and carrying a portion of said gear means which connect the pointers to the pressure-responsive device, and a knob for operating the actuating means from the exterior of the altimeter.

53. An altimeter comprising a pressure-responsive device responsive to changes in altitude, means supporting said pressure-responsive device, actuator means including a member rotatably associated with said supporting means, a shaft operated by said pressure-responsive device and journaled in said rotatable member and being revolvable therewith about the axis of said member while said pressure-responsive device remains bodily stationary and in addition to being rotatable on its own axis relative to said member, indicating means rotatably carried by the supporting means and operatively connected by the shaft to the pressure-responsive device, and means to cause relative movement between said pressure-responsive device and said rotatable member for operating the indicating means by said shaft to set the altimeter for a predetermined altitude or barometric pressure.

54. An indicating instrument comprising a device responsive to changes in conditions to be indicated, relatively stationary means supporting said device, actuator means including a member rotatably associated with said supporting means, a shaft operated by said change responsive device and journaled in said rotatable member and being revolvable therewith about the axis of said member while said change responsive device remains bodily stationary and in addition to being rotatable on its own axis relative to said member, indicating means rotatably carried by the supporting means and operatively connected by the shaft to the change responsive device, and means including a gear train adapted to be operated from the front of the instrument to cause relative movement between said device and said rotatable member for actuating the indicating means by said shaft to set the instrument for a predetermined condition.

55. An indicating instrument comprising a device responsive to changes in conditions to be indicated, relatively stationary means supporting said device, actuator means including a member rotatably associated with said supporting means, a shaft operated by said change responsive device and journaled in said rotatable member and being revolvable therewith about the axis of said member while said change responsive device remains bodily stationary and in addition to being rotatable on its own axis relative to said member, indicating means rotatably carried by the supporting means and operatively connected by the shaft to the change responsive device, means including a gear train adapted to be operated from the front of the instrument to cause relative movement between said device and said rotatable member for actuating the indicating means by said shaft to set the instrument for a predetermined condition, and reference indicating means separate from but operable with said first indicating means during setting for indicating the predetermined condition for which the instrument has been set.

56. An altimeter comprising a pressure-responsive device responsive to changes in altitude, relatively stationary means supporting said pressure-responsive device, actuator means including a member rotatably associated with said supporting means, a shaft operated by said pressure-responsive device and journaled in said rotatable member and being revolvable therewith about the axis of said member while said pressure-responsive device remains bodily stationary and in addition to being rotatable on its own axis relative to said member, indicating means rotatably carried by the supporting means and operatively connected by the shaft to the pressure-responsive device, and means including a gear train adapted to be operated from the front of the altimeter to cause relative movement between the pressure-responsive device and the rotatable member for operating the indicating means by said shaft to set the altimeter for a predetermined altitude or barometric pressure.

57. An altimeter comprising a pressure-responsive device responsive to changes in altitude, relatively stationary means supporting said pressure-responsive device, actuator means including a member rotatably associated with said supporting means, a shaft operated by said pressure-responsive device and journaled in said rotatable member and being revolvable therewith about the axis of said member while said pressure-responsive device remains bodily stationary and in addition to being rotatable on its own axis relative to said member, indicating means rotatably carried by the supporting means and operatively connected by the shaft to the pressure-responsive device, means including a gear train adapted to be operated from the front of the altimeter to cause relative movement between the pressure-responsive device and the rotatable member for operating the indicating means by said shaft to set the altimeter for a predetermined altitude or barometric pressure, and reference indicating means separate from but operable with said first indicating means during setting for indicating the predetermined altitude or barometric pressure for which the altimeter has been set.

58. An altimeter comprising a stationary pressure-responsive device, fixed means supporting said pressure-responsive device, actuator means including a pair of plates secured together in spaced relation and rotatably mounted on said supporting means, a shaft operated by said pressure-responsive device and journaled in and between said plates and being revolvable therewith about the rotational axis thereof in addition to being rotatable on its own axis relative to said plates, a pair of pointers rotatably carried by said supporting means and operatively connected by the shaft to the pressure-responsive device for actuation in the ratio of one to ten, a dial for the pointers and having scales in the ratio of one to ten, and means for rotating said plates for operating the pointers by said shaft to set the altimeter for a predetermined altitude or barometric pressure whereby said pointers are caused to indicate zero on their scales when the predetermined altitude is reached or the barometric pressure occurs.

59. An altimeter comprising a stationary pressure-responsive device, fixed means supporting said pressure-responsive device, actuator means including a pair of plates secured together in spaced relation and rotatably mounted on said supporting means, a shaft operated by said pressure-responsive device and journaled in and between said plates and being revolvable therewith about the rotational axis thereof in addition to being rotatable on its own axis relative to said plates, a pair of pointers rotatably carried by said supporting means and operatively connected by the shaft to the pressure-responsive device for actuation in the ratio of one to ten, a dial for the pointers and having scales in the ratio of one to ten, means for rotating said plates for operating the pointers by said shaft to set the altimeter for a predetermined altitude or barometric pressure whereby said pointers are caused to indicate zero on their scales when the predetermined altitude is reached or the barometric pressure occurs, and a reference indicating device separate from the scales and pointers but operable with the pointers during setting and inoperable during operation of the pointers by the pressure-responsive device for indicating the predetermined altitude or barometric pressure for which the altimeter has been set.

60. An indicating instrument comprising a device responsive to changes in conditions to be indicated, a fixed support for said device, actuator means including a pair of plates having a spacing member securing them together in spaced relation, said plates being rotatably mounted on said fixed support, a shaft operated by said change responsive device and journaled in and between said plates and being revolvable therewith about the common axis thereof in addition to being rotatable on its own axis relative to said plates, a pair of pointers rotatably carried by said fixed support and operatively connected by said shaft to the change responsive device for actuation thereby in a predetermined ratio, a dial for the pointers and having scales calibrated in the ratio of the pointers, means for rotating said plates thereby revolving the shaft about the axis of said plates for operating the pointers to set the instrument for a predetermined condition whereby said pointers indicate zero on their scales when the predetermined condition occurs, and a reference indicating device behind the main dial and viewable through an opening in the latter, said reference indicating device being operable with the pointers during setting and inoperable during operation of the pointers by the change responsive device for indicating the predetermined condition for which the instrument has been set.

VICTOR E. CARBONARA.